United States Patent
Frazier

[11] 3,927,988
[45] Dec. 23, 1975

[54] PELLETING CARBON BLACK

[75] Inventor: Arthur E. Frazier, Toledo, Ohio

[73] Assignee: Phillips Petroleum Company, Bartlesville, Okla.

[22] Filed: Aug. 8, 1973

[21] Appl. No.: 386,577

[52] U.S. Cl. .................. 23/314; 264/117; 264/102
[51] Int. Cl.² ...................... C01B 31/14; B01J 2/12
[58] Field of Search ....... 264/117, 121, 37, 40, 101, 264/102; 23/314, 313; 423/460, 461; 193/10; 302/20, 26, 50; 198/104, 213

[56] References Cited
UNITED STATES PATENTS

| | | | |
|---|---|---|---|
| 2,293,113 | 8/1942 | Carney | 23/314 |
| 2,343,401 | 3/1944 | Carney | 23/314 |
| 2,457,962 | 1/1949 | Whaley | 264/117 |
| 2,511,088 | 6/1950 | Whaley | 23/314 |
| 2,948,918 | 8/1960 | Austin | 23/314 |
| 3,384,460 | 5/1968 | Latham | 23/314 |

Primary Examiner—Norman Yudkoff
Assistant Examiner—S. J. Emery

[57] ABSTRACT

A method of reducing the carbon black loading on a pelleting system by introducing gases, released between the filter and the pelleter, into the pelleter.

7 Claims, 1 Drawing Figure

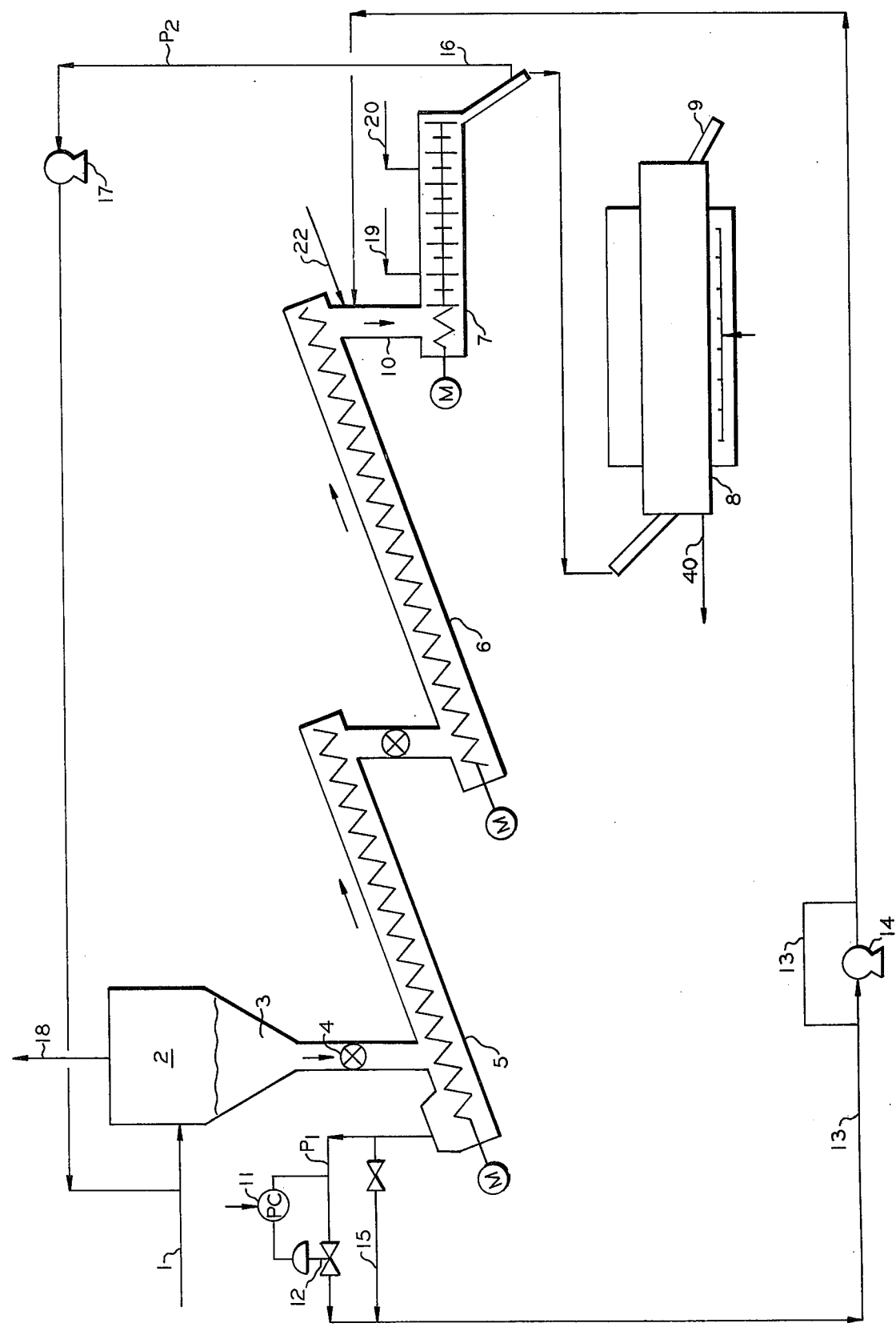

PELLETING CARBON BLACK

This invention relates to the recovery of carbon black.

In one of its more specific aspects, this invention relates to a method of increasing the amount of carbon black recovered during the pelleting operation.

The procedure for recovering carbon black from the furnace process is well known. Generally, the process involves introducing the smoke from the furnace into a filter, collecting the carbon black from the filter, introducing the black into a pelleter, pelleting the black and drying the pellets. Such procedures are discussed in U.S. Pat. Nos. 3,597,170, 3,535,412 and 3,384,460, the disclosures of which are incorporated herein by reference.

Inasmuch as carbon black is a low density material, handling of black results in the production of considerable fines in the form of dust. To minimize atmospheric pollution and to improve general operations, it is present industrial practice to collect carbon black dust from various points in the system by connecting these points to the suction side of a compressor and introducing the discharge of the compressor back into the filter or to a flare where the carbon black is burned.

The procedure of returning the carbon black to the filter can result in the overloading of the filter which, in the usual system, is the limiting equipment within the process. If the carbon black is introduced to a flare or incinerator where it is burned, there can result a considerable loss of carbon black production as well as atmospheric pollution.

The method of the present invention solves this problem by introducing those gases collectible in such a processing system into the inlet to the pelleter wherein they are brought into contact with the mass of carbon black introduced into the pelleter.

The method of this invention is applicable to any carbon black recovery system in which vapors containing particulate carbon black can be collected. Such vapors can be collected from the filter, from the outlet from the filter, from any point in the conveying system which conveys carbon black to the pelleter, from the pelleter or even from the vent gases from the dryer. Generally, the invention involves collecting those carbon black-containing gases evolved at the outlet of the star-valve closing the filter from the screw conveyor inasmuch as it is from this locus that carbon black-containing gases are evolved in the largest amounts.

In general, the method of this invention involves introducing a first mixture comprising carbon black and occluded gases into a carbon black transfer system. Occluded gases containing a minor portion of carbon black are separated from the mixture leaving a major portion of the carbon black in the system. This major portion of the black is transferred through the system into a pelleter. The occluded gases and minor portion of carbon black are withdrawn from the system and introduced into the pelleter into admixture with the major portion of the black. The major and minor portions of the black are then pelleted.

The invention can be easily understood if explained in conjunction with the attached drawing which shows, schematically, one theoretical embodiment of a carbon black collection system to which the invention will be applicable.

Referring now to the attached drawing, carbon black quenched smoke is introduced from the furnace through conduit 1 into filter 2 wherein it is collected as mass 3.

As required, the carbon black from mass 3 passes with those gases occluded therein through star valve or micropulverizer 4 into conveyor 5. One or more conveyors, 5 and 6, is employed to transfer the particulate black to pelleter 7.

Conveyors 5, and 6 if employed, can be of any type. While their purpose is to facilitate the transfer of the major portion of the carbon black between filter 2 and pelleter 7, because of the movement imparted to the carbon black during the transfer, those gases occluded in the black will tend to escape therefrom and accumulate along the upper wall of the conveyor.

The principal portion of the carbon black is passed through the conveyors, and is introduced through conduit 10 into pelleter 7 wherein the black is pelleted in the usual manner and from which it is introduced into dryer 8. From the dryer, dried carbon black pellets are recovered through outlet 9.

In the usual manner, water or pelleting solutions are introduced into the pelleter through conduits 19 and 20 with purge gases evolved from the dryer being recovered from conduit 40, these aspects of the system being conventional within the art.

That gas released from the black within the conveyors will tend to collect along the upper wall of the conveyors and to establish a superatmospheric pressure therein. According to this invention, these gases, with minor amounts of carbon black, are withdrawn from the conveying means and discharged into the carbon black pelleter.

Introduction of the carbon black-containing gases into the pelleter is made in any suitable manner.

In one embodiment, the gases are permitted to collect within the conveyor until they attain a pressure sufficient to actuate pressure controller 11 to open valve 12 and permit their passage through conduit 13 into the pelleter. In this manner, introduction of the carbon black-containing gases into the pelleter is intermittent, the introduction being dependent upon the attainment of a sufficient pressure within the conveyor to open the pressure control valve.

As an alternate embodiment, the pressure control system is bypassed by conduit means 15 with compressor 14, either continuously or intermittently, taking suction on the conveyor to transfer carbon black-containing gases to the inlet of the pelleter.

In the above system, it may be desirable to introduce the gases from conduit 13 into conduit 10 at or after a point of introduction of a pelleting solution into conduit 10 by, for example, conduit 22. Similarly, because of the quantity of gases passing through the pelleter, it may be desirable to introduce some portion of these gases from the outlet from the pelleter into the filter by means of conduit 16, blower 17 facilitating the introduction. Such gases as are so reintroduced into the filter can be discharged therefrom, after black removal, through conduit 18 with the gases which have been separated from the smoke in the filter.

In one embodiment, the method of this invention is employed in the following manner when utilizing a pressure controller in the absence of a compressor.

In one embodiment of the production of carbon black, 438 MSCFH of quenched smoke containing 1830 pounds of carbon black are introduced into a filter. About 1840 pounds per hour of carbon black containing occluded gases are passed from the filter through one or more conveyors and introduced into the pelleter. About 2,230 pounds per hour of aqueous pelleting solution are introduced into the pelleter.

From the one or more conveyors employed, gases occluded with the black are withdrawn, the withdrawal being regulated by a pressure controller set to open a control valve positioned in the conduit through which the occluded gases are withdrawn. This pressure controller is set to open the previously-mentioned control valve at a pressure within the range of from about 0 to about 15 inches of water although the control valve can be regulated to open at a pressure of up to about 20 inches of water.

Under these conditions, calculations show that about 1800 pounds per hour of dry pellets can be produced while about 9.6 MSCFH of gases containing about 40 pounds of carbon are returned from the pelleter to the filter.

In contrast, under prior art conditions, that is, in the absence of the removal of the occluded gases from the conduit or conveyors through which carbon black is conducted to the pelleter, the gases returned from the conveyor to the filter contained about 940 pounds per hour of carbon black.

Accordingly, the method of this invention is calculated to reduce the carbon black recycle rate, and the carbon black loading of the system by about 900 pounds per hour of carbon black.

It is evident from the foregoing that various modifications can be made to the method of this invention. Such, however, are considered to be within the scope of the invention.

What is claimed is:

1. A method of pelleting carbon black which comprises:
   a. introducing a first mixture comprising carbon black and occluded gases into a screw conveyor;
   b. separating and withdrawing occluded gases having carbon black entrained therewith from said mixture at the inlet to said screw conveyor and leaving carbon black to be transferred by the screw conveyor;
   c. transferring said carbon black remaining by said screw conveyor to a pelleter;
   d. admixing the separated and withdrawn occluded gas and the entrained carbon black with the carbon black transferred by the screw conveyor downstream of said screw conveyor and thereafter introducing the resulting admixture into said pelleter; and
   e. forming pellets out of said carbon black in said pelleter.

2. The method of claim 1 in which the withdrawal of said occluded gases and entrained carbon black is regulated by a pressure differential.

3. The method of claim 1 in which said occluded gases are withdrawn through a compressor.

4. The method of claim 1 in which said occluded gases are introduced into the inlet to said pelleter.

5. The method of claim 4 in which a pelleting solution is introduced into contact with said occluded gases at the inlet of said pelleter.

6. The method of claim 1 in which said occluded gases are introduced intermittently.

7. The method of claim 1 in which said occluded gases are introduced continuously.

* * * * *